(12) United States Patent
Stockton et al.

(10) Patent No.: US 10,833,563 B1
(45) Date of Patent: Nov. 10, 2020

(54) MULTI-FACET PARTIAL AIR DEFLECTOR

(71) Applicant: ABB Schweiz AG, Baden (CH)

(72) Inventors: Christopher A. Stockton, Greenville, SC (US); Stephen Douglas Browne, Shelby, NC (US)

(73) Assignee: ABB Schweiz AG, Baden (CH)

( * ) Notice: Subject to any disclaimer, the term of this patent is extended or adjusted under 35 U.S.C. 154(b) by 1 day.

(21) Appl. No.: 16/453,159

(22) Filed: Jun. 26, 2019

(51) Int. Cl.
*H02K 5/20* (2006.01)
*H02K 9/18* (2006.01)
*H02K 5/18* (2006.01)
*H02K 5/16* (2006.01)
*H02K 5/15* (2006.01)

(52) U.S. Cl.
CPC ............ *H02K 9/18* (2013.01); *H02K 5/15* (2013.01); *H02K 5/161* (2013.01); *H02K 5/18* (2013.01)

(58) Field of Classification Search
CPC .. H02K 9/14; H02K 9/06; H02K 9/08; H02K 9/18; H02K 5/20
See application file for complete search history.

(56) References Cited

U.S. PATENT DOCUMENTS

| | | | |
|---|---|---|---|
| 3,518,467 A | 6/1970 | Wightman | |
| 3,610,975 A * | 10/1971 | Onjanow | H02K 9/18 310/57 |
| 4,908,538 A * | 3/1990 | Geberth, Jr. | H02K 5/20 310/59 |
| 5,925,947 A * | 7/1999 | Kajiwara | H02K 9/18 310/58 |
| 6,172,436 B1 * | 1/2001 | Subler | F16C 33/6662 29/898.11 |
| 6,734,584 B1 | 5/2004 | Browne et al. | |

* cited by examiner

*Primary Examiner* — Dang D Le
(74) *Attorney, Agent, or Firm* — Leydig, Voit & Mayer, Ltd.

(57) ABSTRACT

A totally-enclosed fan-cooled motor, including a stator provided in a closed motor housing, a rotor provided to the stator and mounted to a rotation shaft, a pair of bearings for holding a drive side and a non-drive side of the shaft, an external fan provided on the non-drive side of the shaft and outside the motor for sending wind to the motor housing, an air deflector mounted to an endplate disposed on the drive side located on an outer side of the bearing and the endplate holding the drive side of the shaft, outside the motor and proximal the bearing for cooling the bearing holding the drive side of the shaft. The air deflector includes a plurality of faceted surfaces at obtuse angles to one another about a periphery of the air deflector to deflect wind across the endplate and the drive side bearing.

20 Claims, 14 Drawing Sheets

SECTION A-A

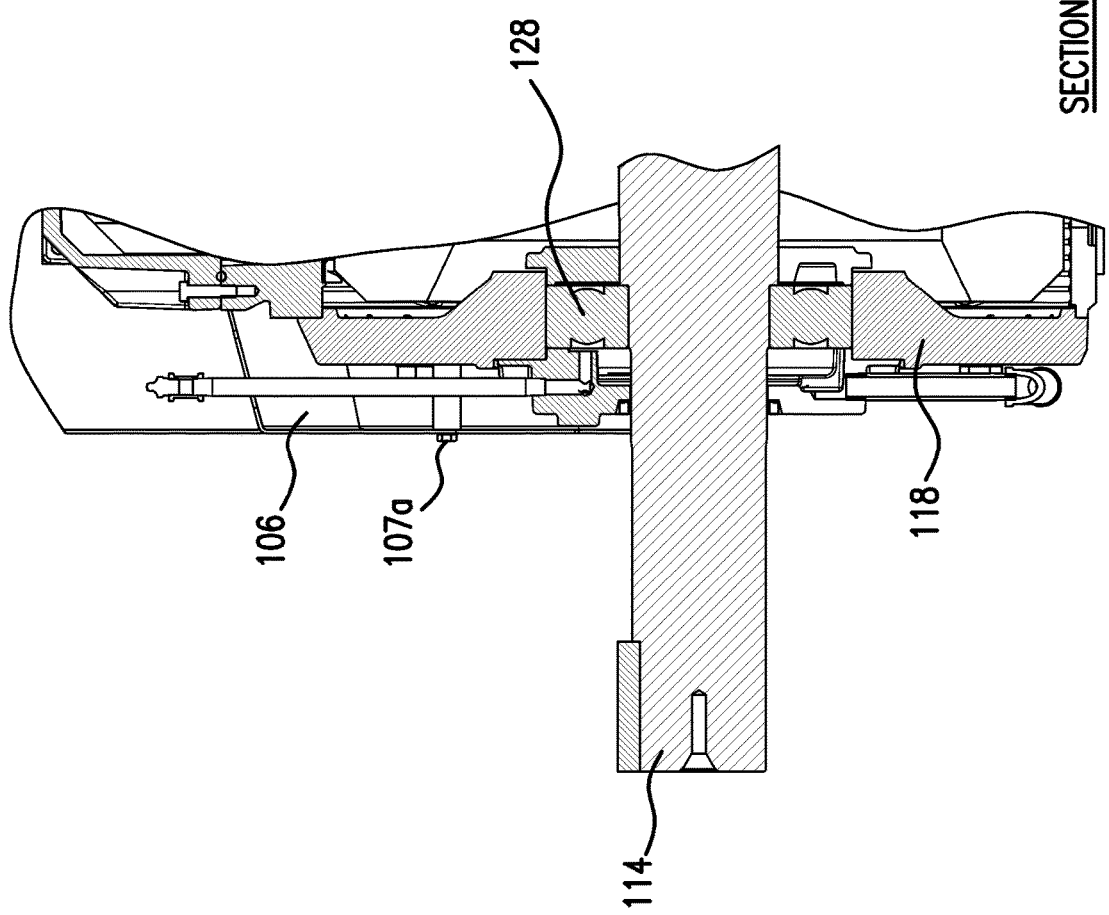

SECTION E-E

VIEW A

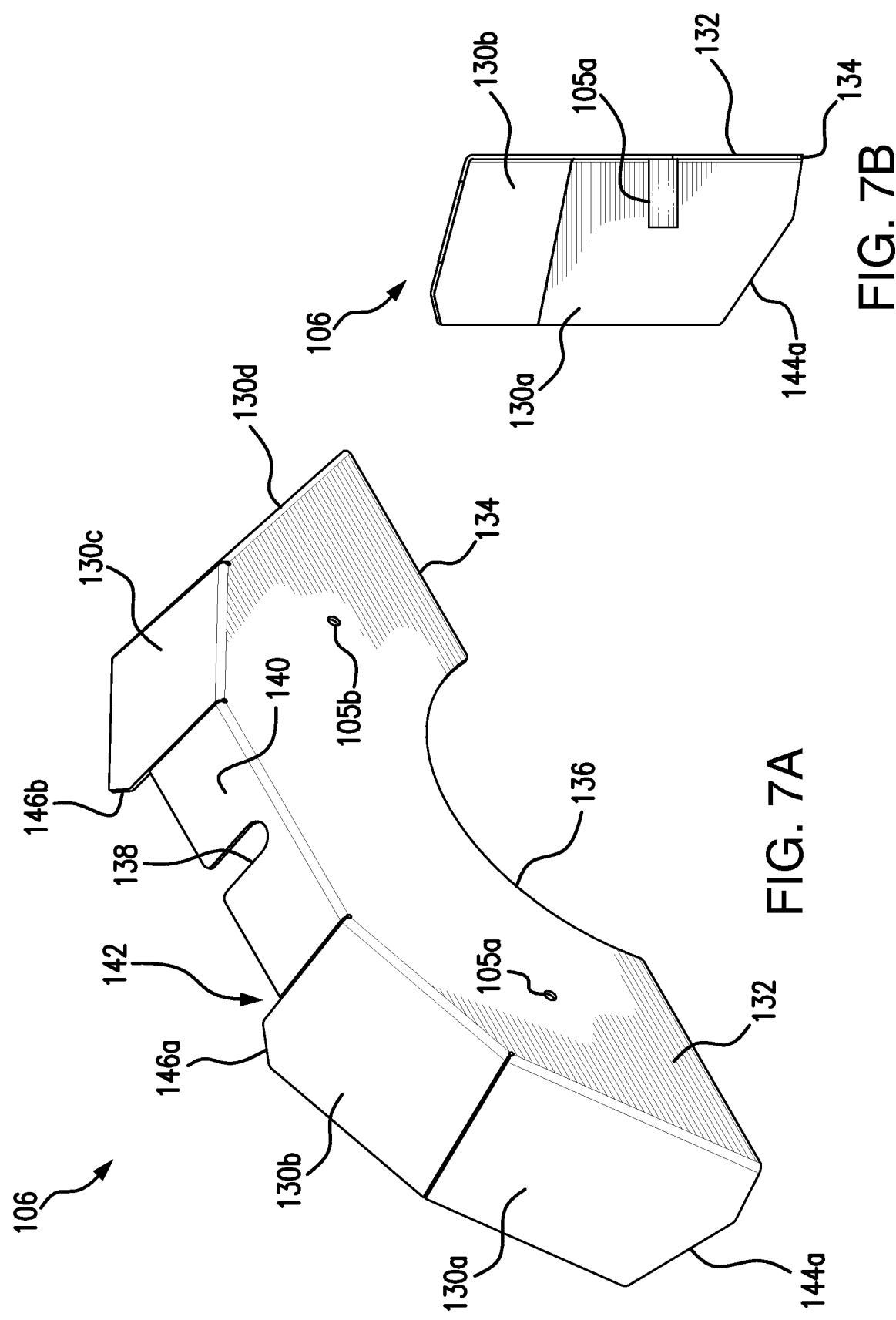

MULTI-FACET PARTIAL AIR DEFLECTOR

BACKGROUND OF THE INVENTION

In the operation of an electric motor, a considerable amount of heat is generated within the motor due to losses in the stator, stator windings, bearing friction, and losses in the rotor. Typically, as shown in FIG. 1, a conventional motor 10 is provided with a built-in cooling fan 22 having a fan cover 26 to circulate cooling air 30, 32 over the stator windings, through an air gap 24 between the outer periphery of a rotor 12 and a bore 28 of a stator core 14, and through a hole in the rotor core 12 having a drive shaft 18 rotatably mounted in a bearing 16, and/or stator core 14 as well as spaces between the stator core 14 and shell 20. If the motor 10 is sufficiently cooled, it will operate more efficiently and will have a longer service life.

In many electric motors, the cooling fans are axial or have radial vane fans mounted on the rotor shaft or are die-cast-in-place on the ends of the rotor. In certain motor designs, however, it has been found that the cooling air circulated by the cooling fan within the motor was not sufficient to prevent the temperature of parts of the motor from exceeding permissible temperature limits. It was found that although the fan was capable of circulating a sufficient flow of air through the motor, the air circulated by the fan moved in a circular direction within the motor housing adjacent the tips of the rotating fan blades and around the end turns of the stator windings and thus did not flow in a sufficient amount longitudinally through the motor.

In U.S. Pat. No. 3,518,467, a totally enclosed, fan-cooled (TEFC) electric motor is disclosed which has auxiliary vanes and shrouds for aiding the flow of cooling air through the motor, for providing increased heat transfer area, and for directing cooling air over the exterior surfaces of the motor. However, these auxiliary vanes and shrouds could not be adapted to many conventional motor designs because of insufficient space adjacent the ends of the stator windings and the end shield. Also, this prior auxiliary vane system required substantial modifications to be made to the motor that may not be cost effective.

In TEFC motors a shaft driven fan is normally placed on one end of the motor opposite the drive end of the motor. This fan is driven by the motor itself and blows external ambient air over the motor. Due to the cylindrical nature of a TEFC motor and the fact that air is only being blown over the motor from one side, the drive end of the a TEFC motor becomes difficult to cool and increases the temperature of the bearing on the drive end of the motor. In the past a second fan would be added to help circulate air around the drive end face of the motor and help cool the drive end bearing. This second fan increases the cost and imposes limitations on the user to be able to couple motors together as needed. Thus, there is a need to provide an efficient and low cost way to keep a TEFC motor cooled.

BRIEF SUMMARY OF THE INVENTION

The invention provides a totally-enclosed fan-cooled motor including a stator provided in an air-tightly closed motor housing, a rotor provided oppositely to the stator and mounted to a rotation shaft, a pair of bearings for holding a drive side and a side opposite to the drive side of the rotation shaft, and an external fan provided on the side opposite to the drive side of the rotation shaft and outside the motor for sending wind to the motor housing. The motor also includes an air deflector mounted to an endplate disposed on the drive side so as to be located on an outer side of the bearing and the endplate holding the drive side of the rotation shaft, outside the motor and in the vicinity of the bearing for cooling the bearing holding the drive side of the rotation shaft. The air deflector includes a plurality of faceted surfaces disposed at obtuse angles relative to each faceted surface about a periphery of the air deflector directed to deflect wind across the endplate and the drive side bearing. The air deflector also includes a wind direction guide provided on the drive side for receiving wind sent from the external fan to change a direction of the wind toward the endplate and drive bearing.

The invention provides a An air deflector for a totally-enclosed fan-cooled motor including an air deflector mounted to a rotation shaft so as to be located on an outer side of a bearing holding a drive side of the rotation shaft, outside a motor and in the vicinity of the bearing for cooling the bearing holding the drive side of the rotation shaft. The air deflector includes a plurality of faceted surfaces disposed at obtuse angles relative to each faceted surface about a periphery of the air deflector directed to deflect wind across the endplate and the drive side bearing. The air deflector also includes a wind direction guide provided on the drive side for receiving wind sent from the external fan to change a direction of the wind toward the endplate and drive bearing.

BRIEF DESCRIPTION OF THE SEVERAL VIEWS OF THE DRAWING(S)

FIG. 4B is a cross-sectional view taken along B-B of FIG. 4A of the electric motor having a faceted air deflector.

FIG. 7A is a perspective view of the faceted air deflector according to an embodiment.

FIG. 7B is a schematic side plan view of the faceted air deflector of the electric motor of FIG. 7A.

DETAILED DESCRIPTION OF THE INVENTION

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Figure 1:
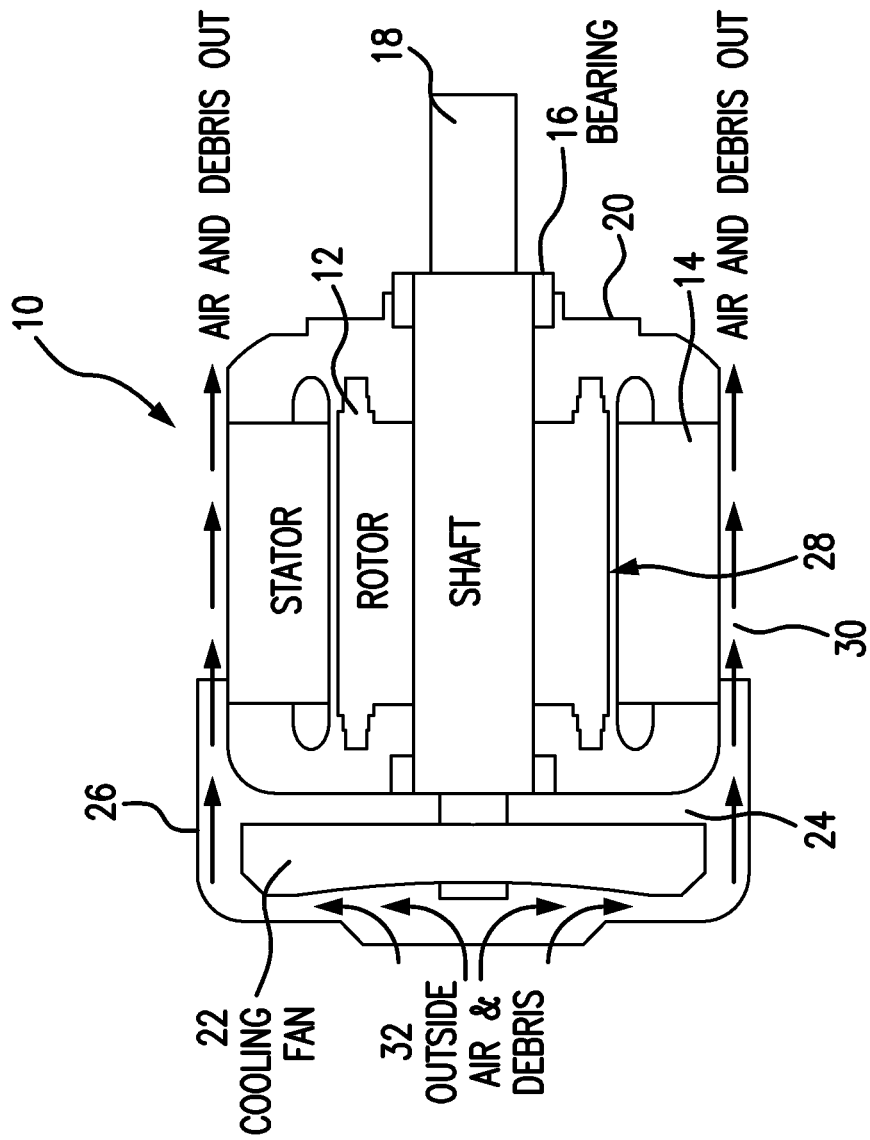
FIG. 1 is a diagrammatic view of a conventional electric motor having a covered fan.
Figure 2:
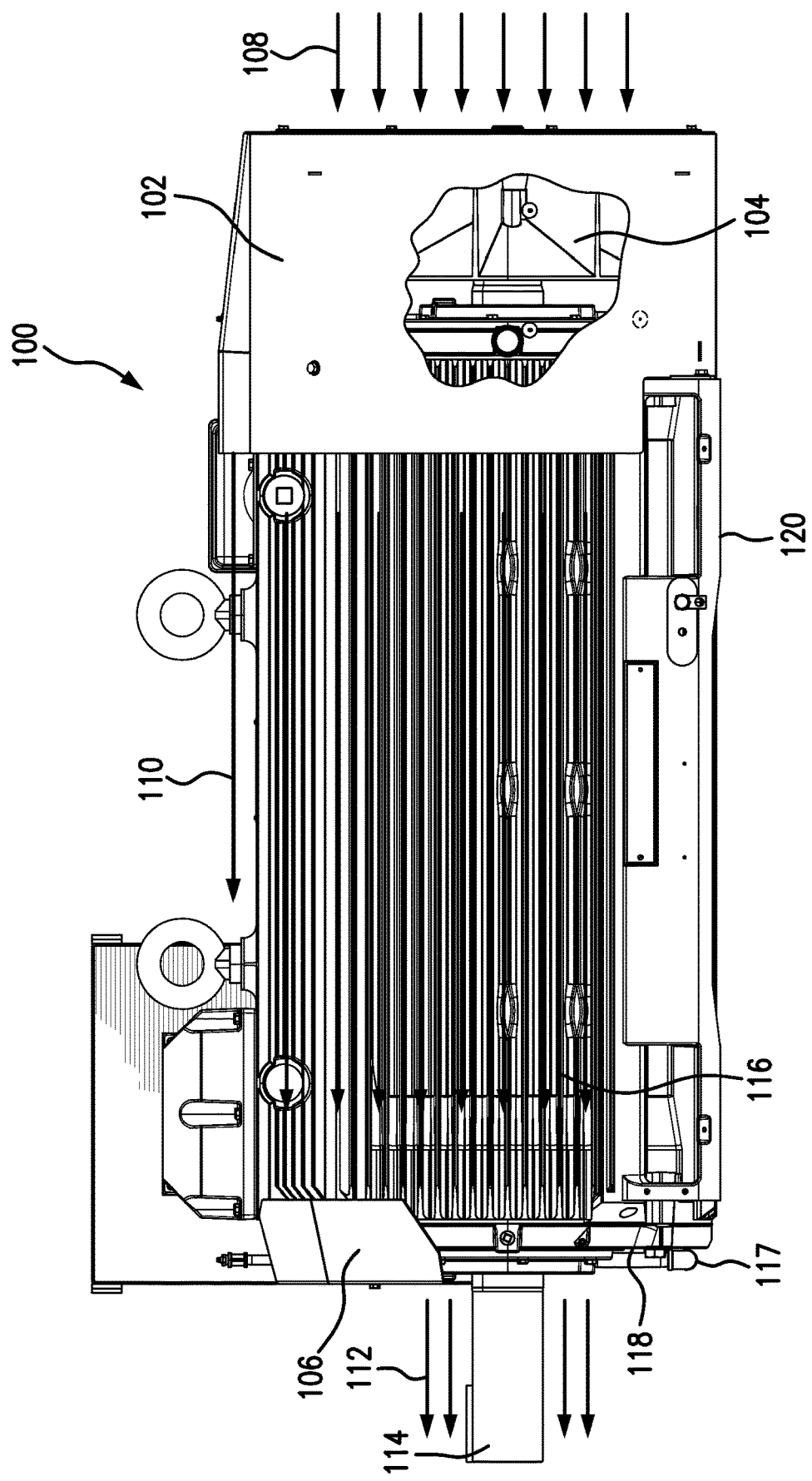
FIG. 2 is a cut-away diagrammatic view of an electric motor having a faceted air deflector and a fan according to an embodiment.

Referring now to FIG. 2, there is a TEFC electric motor 100 including a fan cover 102 having air vents, disposed at a non-drive end portion of the motor 100, a rotatable main cooling fan 104 disposed within the fan cover 102 and configured to draw in an air inflow 108 towards fins/ribs 116 disposed on an exterior of motor 100. Motor 100 also includes a base 120, a multi-faceted air deflector 106 configured to redirect air flow 108 across fins 116 towards a drive end portion of the motor 100. Motor 100 further includes an endplate 118 and a rotation shaft 114 disposed at the drive end portion. In some embodiments the resultant redirected air flow 112 moves across endplate 118 which may include a drive bearing 128 (see FIG. 4A) for cooling of the same. In certain embodiments, the multi-faceted air deflector 106 may partially encompass the endplate 118 of motor 100 as more clearly shown in FIG. 4A.

Figure 3A:
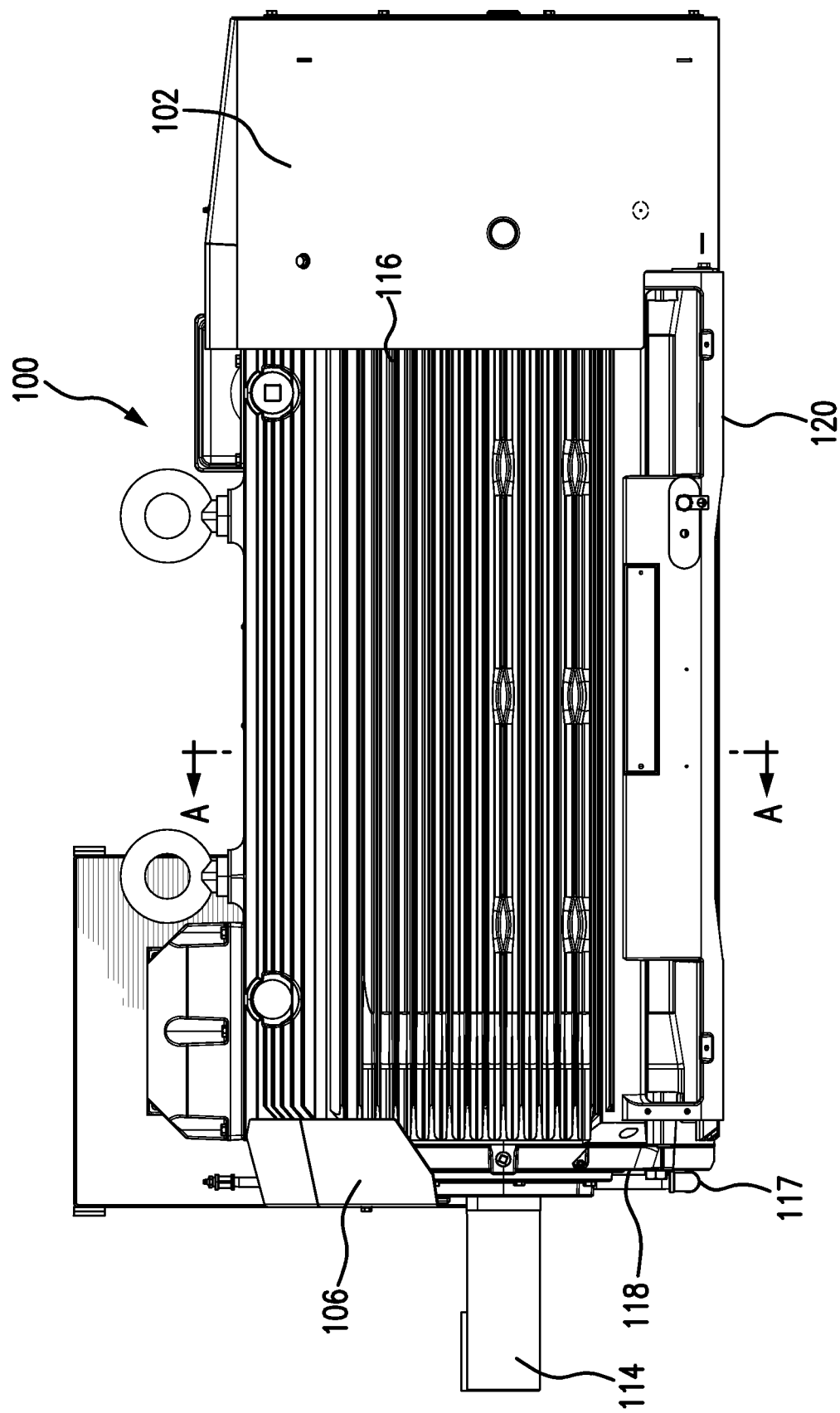
FIG. 3A is a diagrammatic view of the electric motor of FIG. 2 according to an embodiment.
Figure 3B:
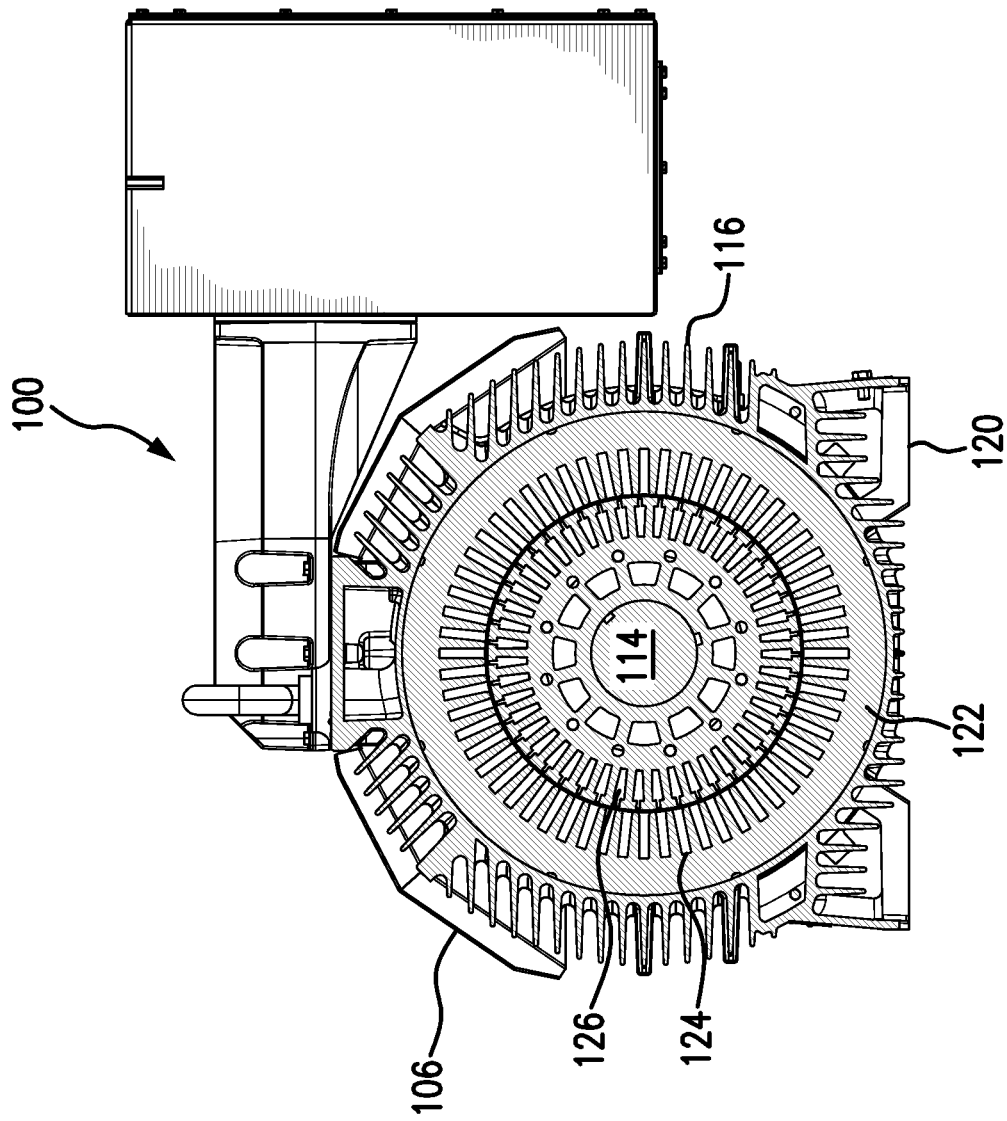
FIG. 3B is a cross-sectional view taken along A-A of FIG. 3A of the electric motor having a faceted air deflector.

Referring now to FIGS. 3A and 3B, there is the electric motor 100 of FIG. 2 including a cross-sectional view taken along A-A of FIG. 3A of the electric motor 100 in which the internal structure of motor 100 may be illustrated. FIG. 3B shows motor 100 including insulation 122, a stator portion 124 a rotor portion 126 configured for rotation, the rotation shaft 114, an air gap between the stator portion 124 and the rotor portion 126. It should be understood that motor 100 may include a non-drive bearing, a non-drive endplate, a shaft connected to the rotation shaft 114 and bearing seals disposed about the shaft.

In some embodiments, by adding a multi-faceted and flared air deflector 106 the need for a drive end fan can be eliminated as well as any customer motor coupling limitations. The flared and multi-faceted air deflector 106 may be configured in such a way that the air from the main cooling fan 104 opposite the drive end of the motor 100 is captured and directed over the drive end endplate 118 acting as a wind direction guide, thus cooling the drive end bearing 128 and eliminating the need for a drive end fan and limitations on the motor couplings.

Figure 4A:
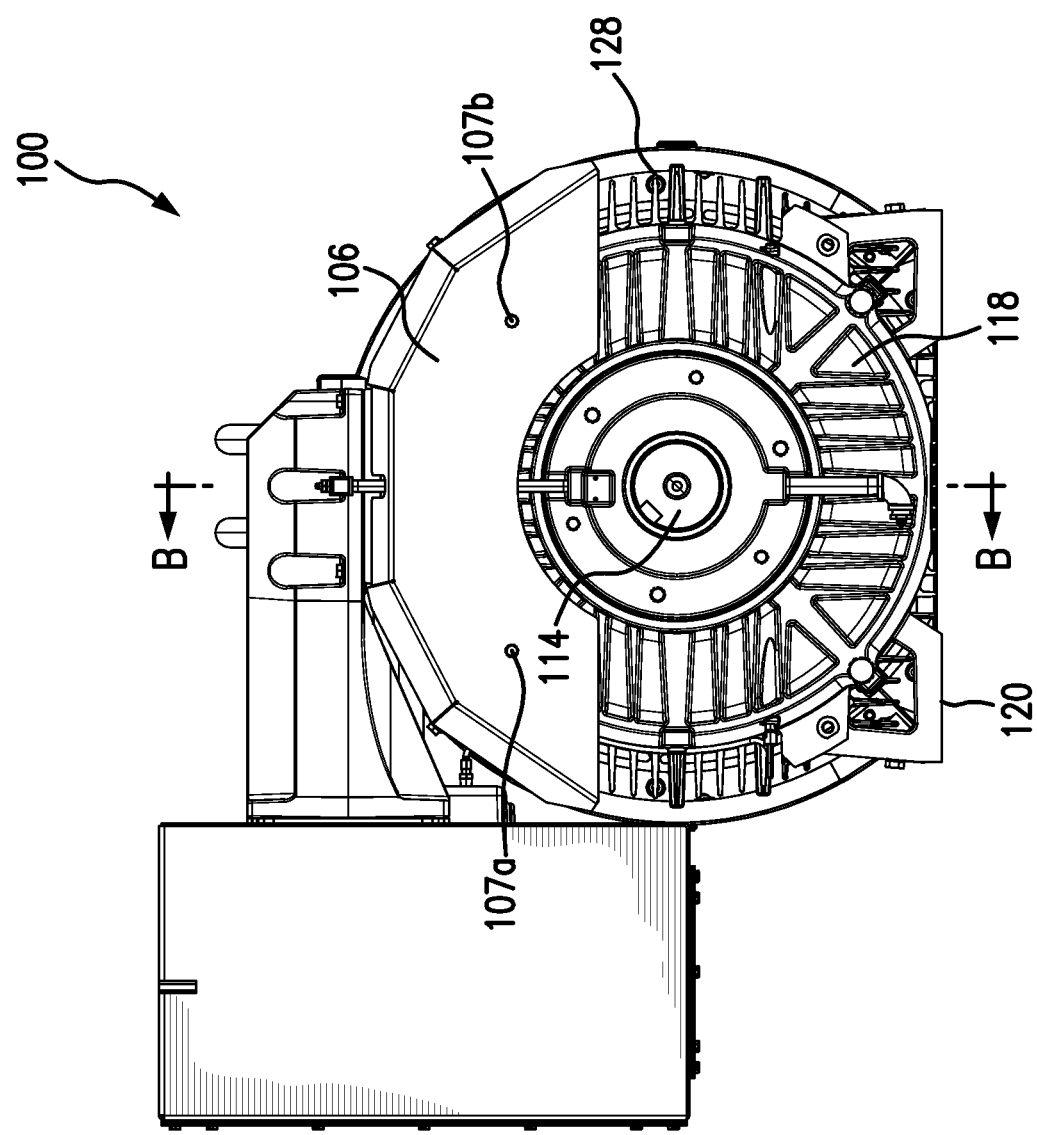
FIG. 4A is a diagrammatic end view of the electric motor having a faceted air deflector of FIG. 2.

Referring now to FIGS. 4A and 4B, there is the electric motor 100 including a multi-faceted air deflector 106, an endplate 118 disposed at the drive end of motor 100 and a drive bearing 128 disposed about rotation shaft 114. FIG. 4B illustrates a cross-sectional view taken along B-B of FIG. 4A showing the endplate 118, rotation shaft 114, bearing 128 and multi-faceted air deflector 106. FIG. 4B also illustrates the mounting connection between air deflector 106 and endplate 118 via deflector mounting bolt 107a.

Figure 5A:
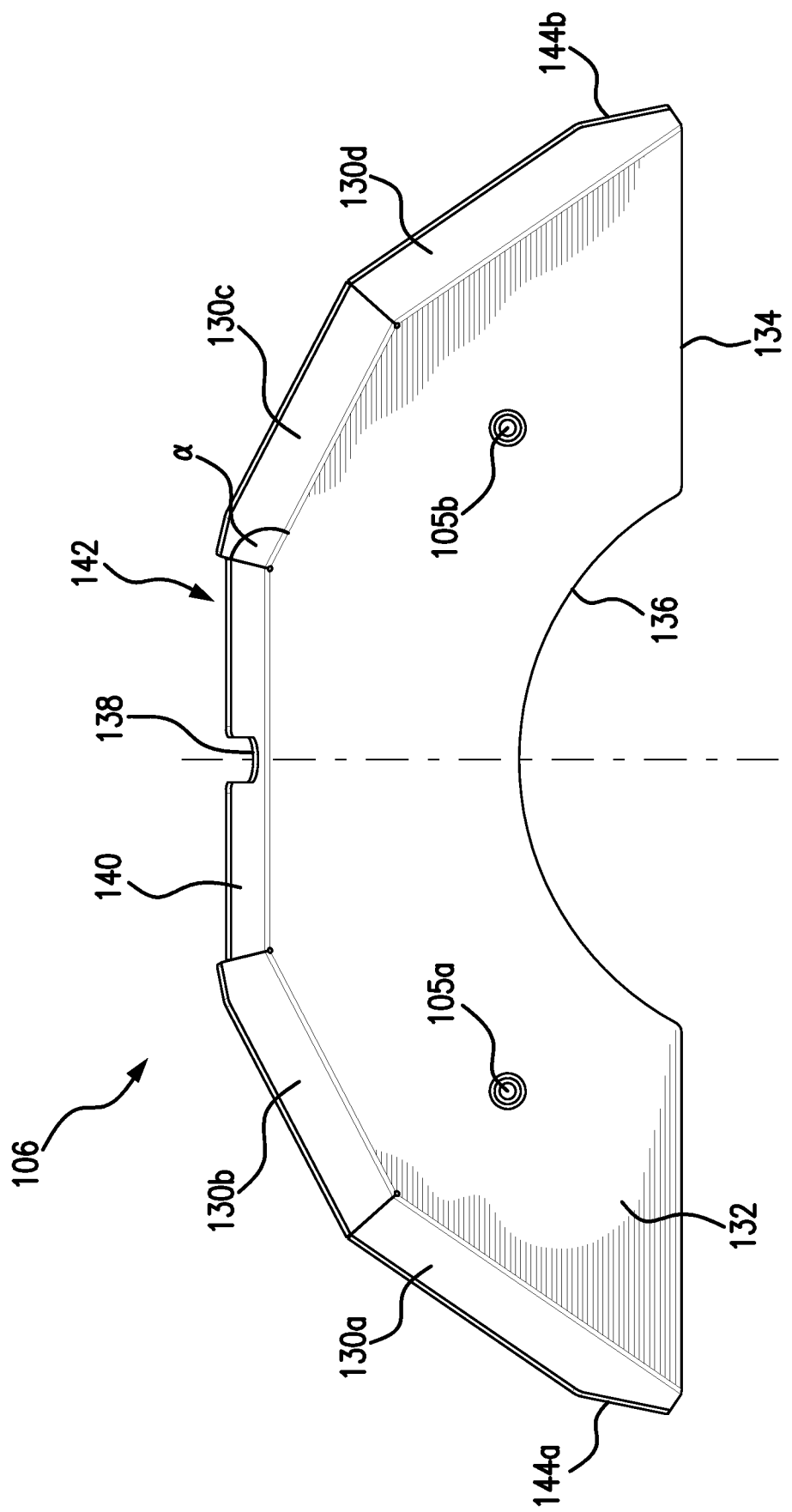
FIG. 5A is a schematic plan view of the faceted air deflector of the electric motor according to an embodiment.
Figure 5B:
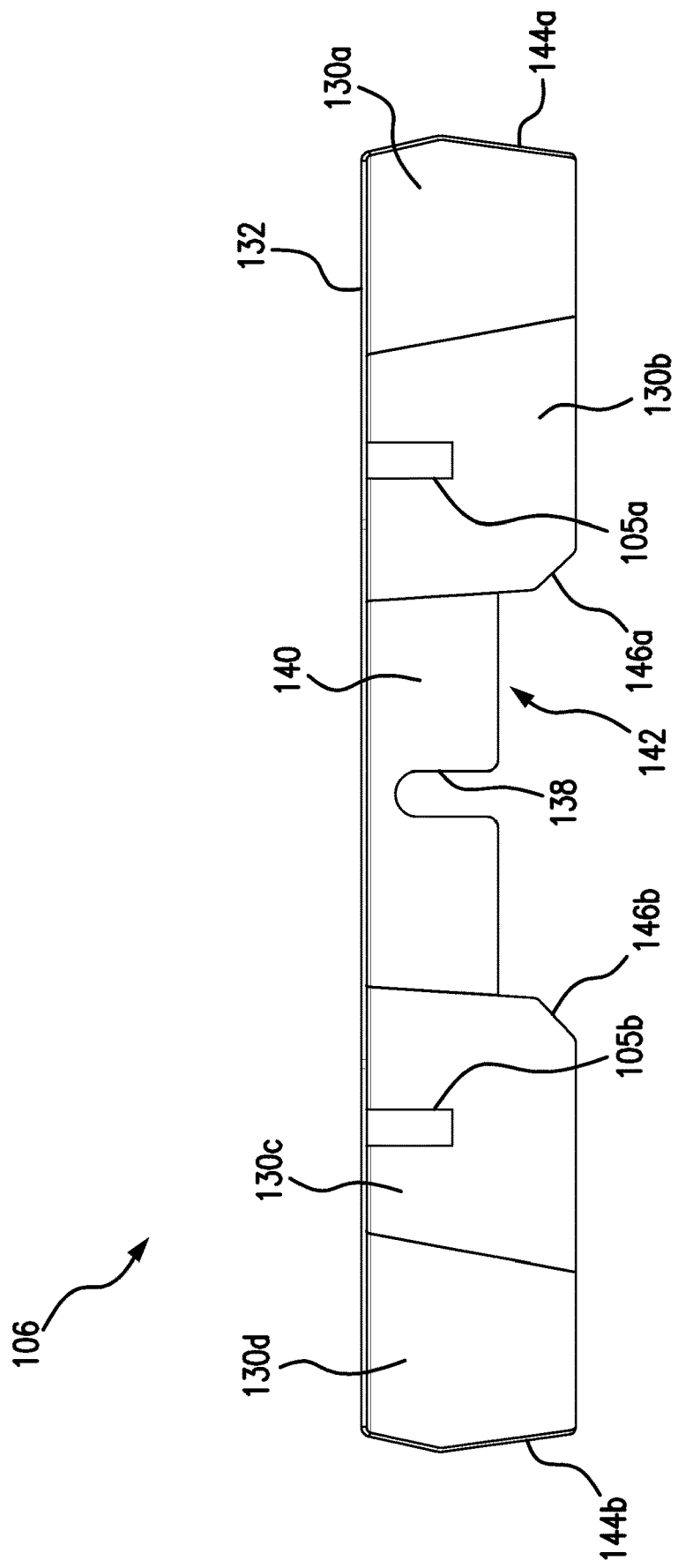
FIG. 5B is a schematic top plan view of the faceted air deflector of the electric motor of FIG. 5A.
Figure 5C:
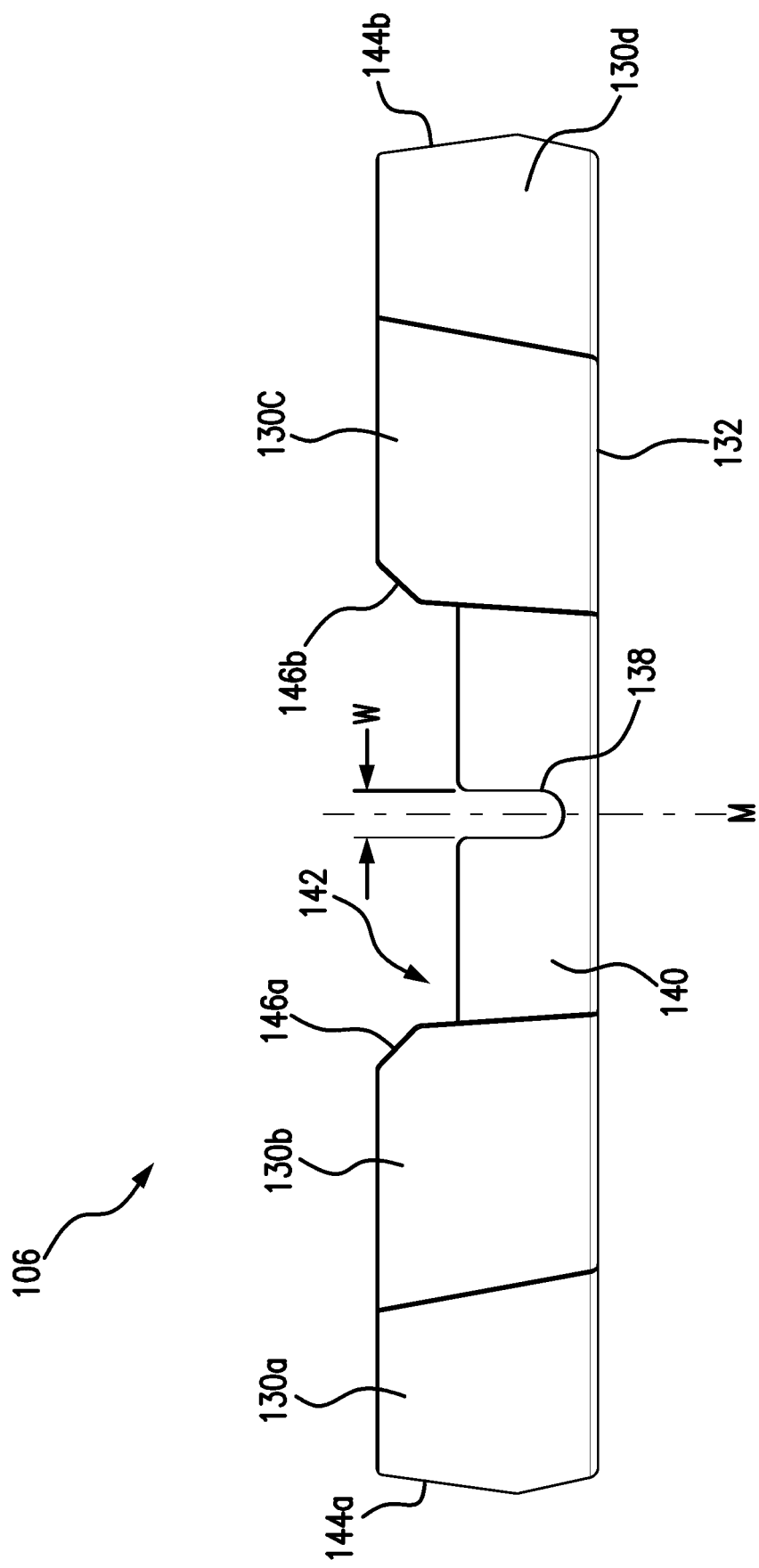
FIG. 5C is a schematic bottom plan view of the faceted air deflector of the electric motor of FIG. 5A.

Referring now to FIGS. 5A to 5C, there is the multi-faceted air deflector 106 of the electric motor 100 according to an embodiment. In certain embodiments, air deflector 106 includes a plurality of facets, such as, 130a, 130b, 130c and 130d each set to an obtuse angle of deflection a in four spaced apart locations along a periphery of air deflector 106. In some embodiments, the angle of deflection a is determined by a flare angle 4 as discussed below and the length of the facets 130a to 130d. In certain embodiments, the angle of deflection a is about 135 degrees. Air deflector 106 having a central bisector midpoint M which intersects the rotation shaft 114 axis, further includes mounting holes 105a and 105b disposed in a plate-like part 132 and these holes 105a, 105b are configured to receive mounting bolts 107a, 107b to mount air deflector 106 to endplate 118 (See FIG. 9). Air deflector 106 may also include a bottom edge surface 134, an opening 136 access and clearance to the rotation shaft 114 and bearing 128, a notch 138, a top surface 140, a recess portion 142 disposed proximal the notch 138 and the top surface 140 to allow for clearance for a bearing regreasing tool 117 disposed proximal bearing 128 and endplate 118. In FIG. 5B, facets 130a to 130d may include chamfered ends at 144a and 144b disposed proximal bottom edge surface 134 and chamfered ends 146a and 146b disposed proximal recess portion 142 all of which are configured to provide additional clearance spacing. As shown in FIG. 5C, notch 138 also may be configured to allow for the clearance width W for regreasing tool 117.

In some embodiments, the multi-faceted air deflector 106 is comprised of metal and configured to partially encompass the endplate 118 of a motor 100. In certain embodiments, air deflector 106 can also be made of molded polymers when used in mild environments and polymer materials can lead to any desired shape configuration for air deflector 106 to maximize airflow 112. However, a robust metal design, such as sheet metal, may be more suitable for harsh, heavy duty environments. The multiple facets 130a to 130d includes the flare angle φ (See FIGS. 6B and 8) configured to provide more area for collection and directing of airflow 110, 112 as compared to a conventional rolled, rounded deflector that mimics the motor frame profile.

Incorporating facets 130a to 130d into the air deflector 106 configuration provides for a faster and easier way to fabricate the air deflector 106 than a conventional rolled/spinning metal version. The faceted flare angle φ also provides the following benefits: provides more area for collection and directing of airflow 110, 112; partial covering gives more access to the face of the motor endplate/bracket 118 when needed; and allows more access for customer to couple motor than a conventional full-face air deflector by preventing the need for motor disassembly.

Figure 6A:
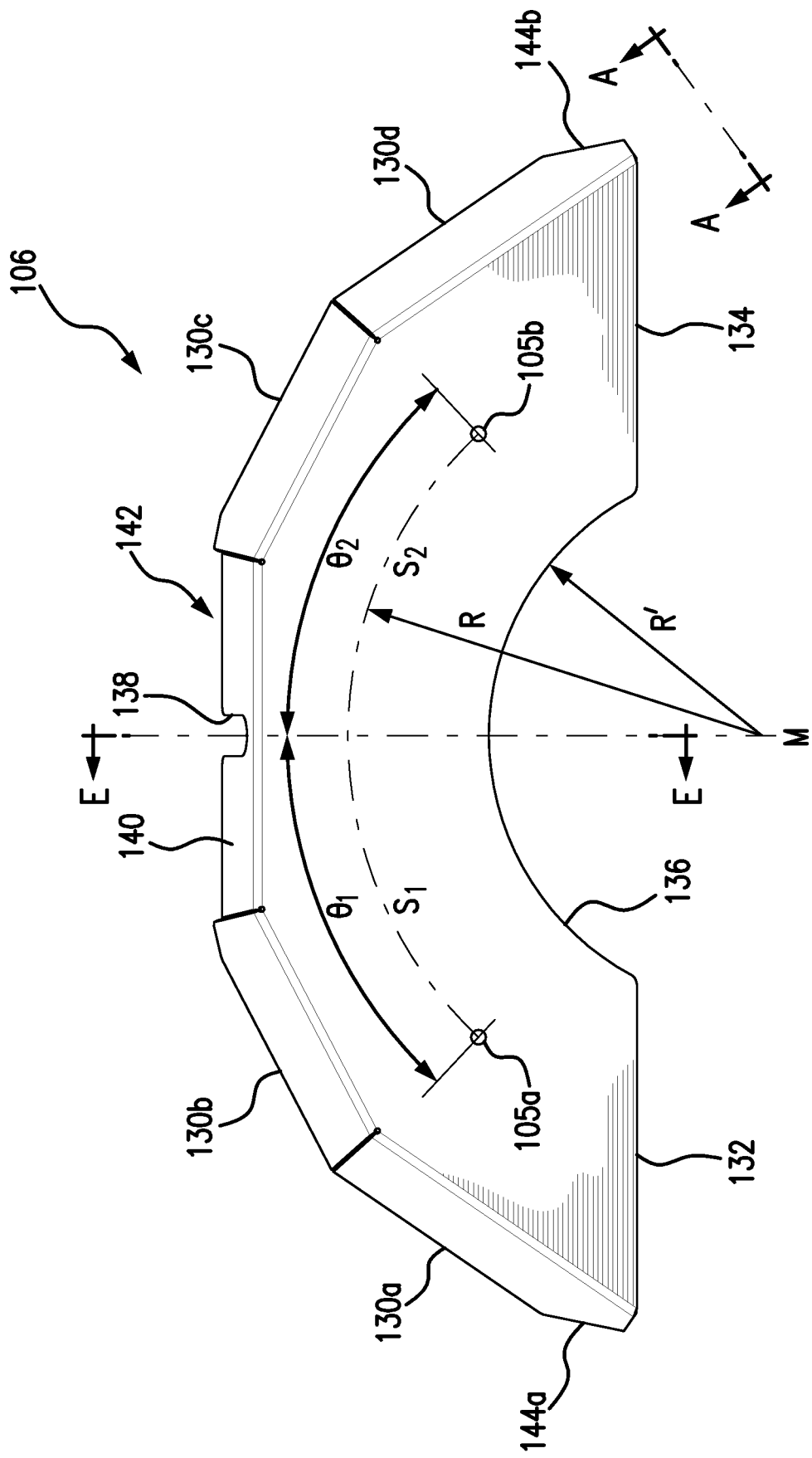
FIG. 6A is a perspective front plan view of the faceted air deflector of an electric motor according to an embodiment.
Figure 6C:
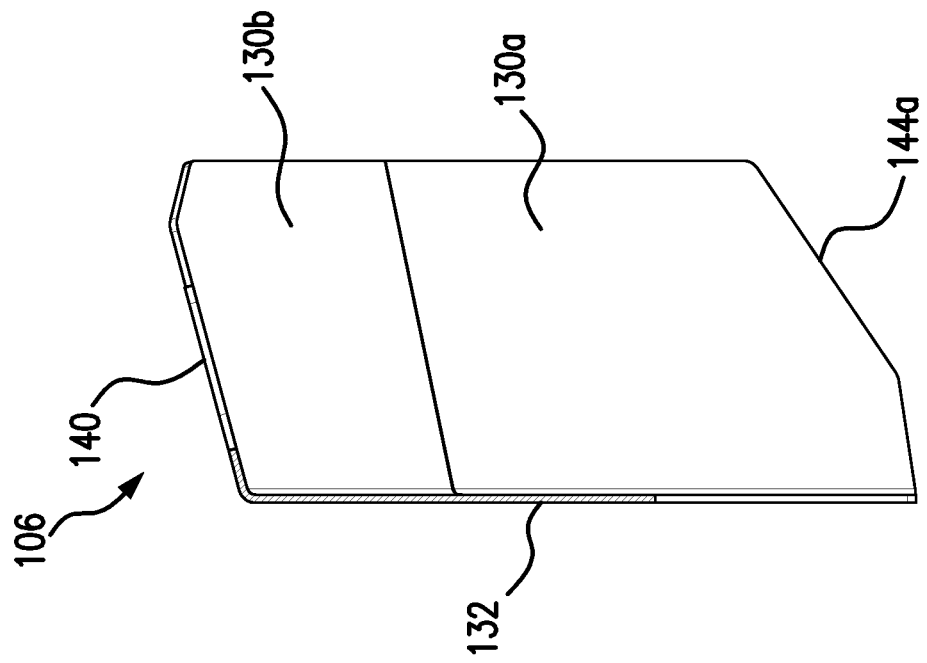
FIG. 6C is a schematic profile view of the faceted air deflector of the electric motor taken along E-E of FIG. 6A.
Figure 6B:
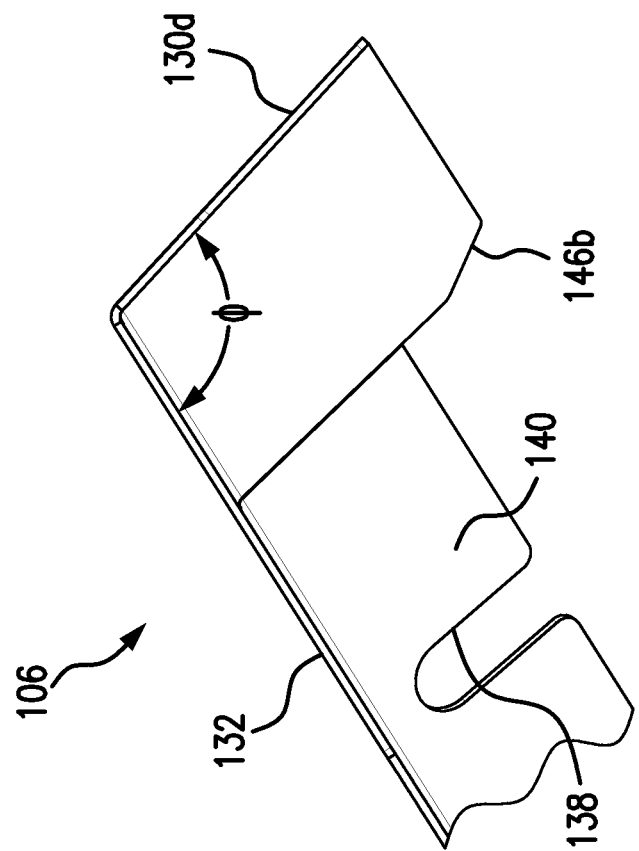
FIG. 6B is a schematic bottom side view of the faceted air deflector of the electric motor taken along A-A of FIG. 6A.

Referring now to FIGS. 6A to 6C, there is the multi-faceted air deflector 106 of an electric motor 100 according to an embodiment. In FIG. 6A, air deflector 106 includes a bisecting midpoint M from which a radius of curvature R defining the relative positioning of mounting holes 105a, 105b in a symmetrical position with respect to each other. Also, another radius of curvature R' defines opening 136 with respect to the bisecting midpoint M. Further, the positioning of holes 105a, 105b upon plate-like part 132 may be defined by angle $\Theta_1$ for hole 105a and angle $\Theta_2$ for hole 105b with respect to the bisecting midpoint M. In other words, an arc length $S_1=R\,\Theta_1$ defines the location of hole 105a from the midpoint M and an arc length $S_2=R\,\Theta_2$ define the location of hole 105b from the midpoint M all disposed on plate-like part 132 of air deflector 106. In certain embodiments, a length of a surface at 132 on the drive side of the air deflector in a diameter direction is longer on a side of the rotation shaft than a length of a plate-shaped part 132 formed on the surface on the side opposite to the drive side in the diameter direction. In other words, the length including the flare angle ϕ extends longer due to the flare configuration. In FIG. 6B taken along A-A of FIG. 6A, the flare angle ϕ is illustrated and in some embodiments, angle ϕ is between about 100 to 115 degrees, preferably at about 105 degrees for air flow 112 and compactness of design for air deflector 106. FIG. 6C taken along E-E of FIG. 6A, illustrates the relative positioning of chamfered edge 144a with respect to facets 130a, 130b and plate-like part 132 of air deflector 106.

Referring now to FIGS. 7A and 7B, there is the multi-faceted air deflector 106 according to an embodiment. FIG. 7A further illustrates the combined features of air deflector 106 as discussed above. FIG. 7B illustrates the mounting hole 105a and the chamfered edge 144a features of air deflector 106.

Figure 8:
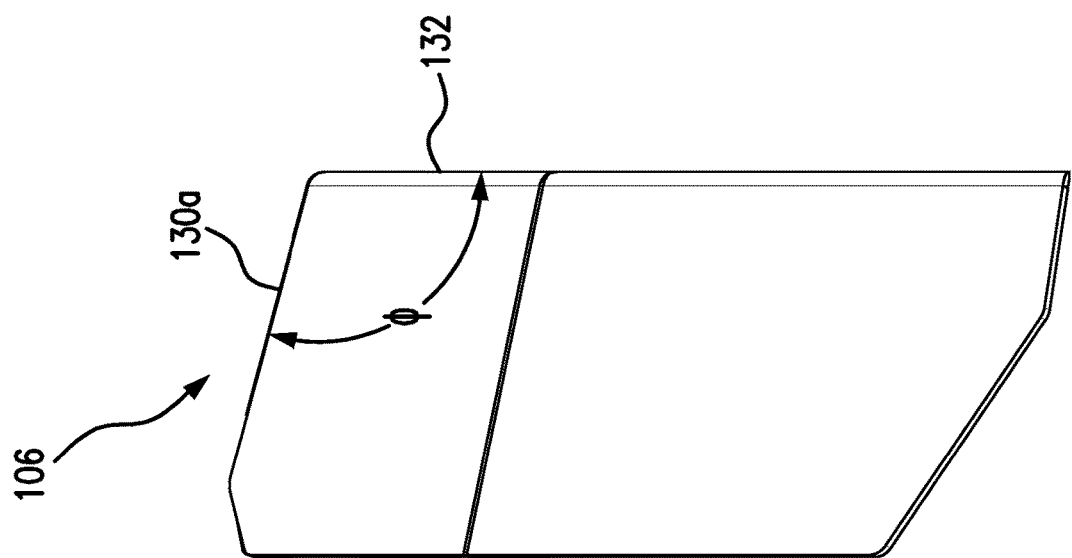
FIG. 8 is a schematic view of a working angle for the faceted air deflector of the electric motor according to an embodiment.

Referring now to FIG. 8, there is a flare angle ϕ for the multi-faceted air deflector 106 of the electric motor 100 according to an embodiment. As discussed above, angle ϕ is about 100 to 115 degrees in some embodiments and preferably 105 degrees to provide the maximum airflow 112 while maintaining a compact configuration for air deflector 106.

Figure 9:
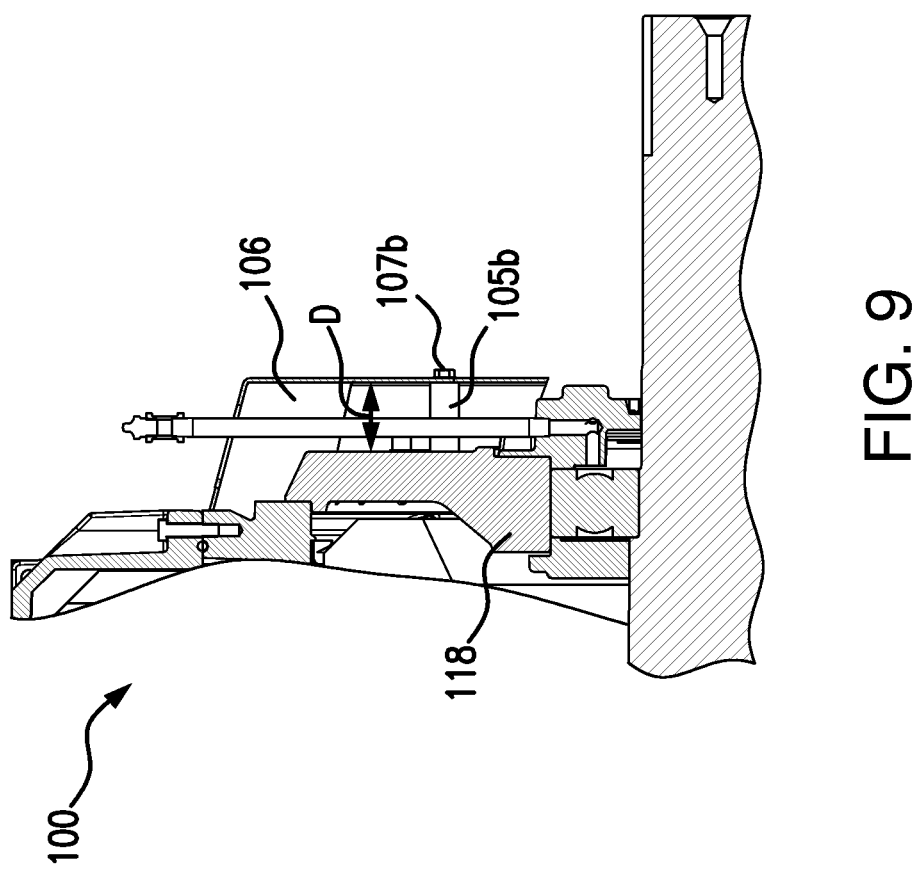
FIG. 9 is a diagrammatic cross-sectional view of the electric motor having mounted spaced apart faceted air deflector according to an embodiment.

Referring now to FIG. 9, there is a cross-sectional view of the electric motor 100 having the multi-faceted air deflector 106 according to an embodiment. In FIG. 9, air deflector 106 is mounted to endplate 118 via mounting bolts 107a, 107b passing through mounting holes 105a, 105b, respectively. In some embodiments, air deflector 106 is configured to be a distance D spaced apart from endplate 118. In certain embodiments, distance D is about 2 inches for optimal airflow 112 to occur to cool the bearing 128 and endplate 118 during operation of motor 100.

In certain embodiments, air deflector 106 provides the benefits of being a modular configuration with smaller component parts and is configured to be electrically isolated from motor 100 thereby preventing bearing currents and shaft currents to occur during use.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. Thus, it will be appreciated that the scope of the present invention is not limited to the above described embodiments, but rather is defined by the appended claims; and that these claims will encompass modifications of and improvements to what has been described.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A totally-enclosed fan-cooled motor, comprising:
a stator provided in an air-tightly closed motor housing;
a rotor provided oppositely to the stator and mounted to a rotation shaft;
a pair of bearings for holding a drive side and a side opposite to the drive side of the rotation shaft;
an external fan provided on the side opposite to the drive side of the rotation shaft and outside the motor for sending wind to the motor housing;
an air deflector mounted to an endplate disposed on the drive side so as to be located on an outer side of the bearing and the endplate holding the drive side of the rotation shaft, outside the motor and in the vicinity of the bearing for cooling the bearing holding the drive side of the rotation shaft, wherein the air deflector includes:
a plurality of faceted surfaces disposed at obtuse angles relative to each faceted surface about a periphery of the air deflector directed to deflect wind across the endplate and the drive side bearing, and
a wind direction guide provided on the drive side for receiving wind sent from the external fan to change a direction of the wind toward the endplate and drive bearing.

2. The totally-enclosed fan-cooled motor according to claim 1, wherein the plurality of faceted surfaces respectively extending in a direction away from the rotation shaft.

3. The totally-enclosed fan-cooled motor according to claim 1, wherein the plurality of faceted surfaces are integrally connected.

4. The totally-enclosed fan-cooled motor according to claim 1, wherein the plurality of faceted surfaces partially encompass the endplate.

5. The totally-enclosed fan-cooled motor according to claim 4, wherein a length of the surface on the drive side of the air deflector in a diameter direction is longer on a side of the rotation shaft than a length of a plate-shaped part formed on the surface on the side opposite to the drive side in the diameter direction.

6. The totally-enclosed fan-cooled motor according to claim 1, wherein the air deflector includes:
a plate-shaped part formed concentrically with the rotation shaft and the plate-shaped part is connected to the plurality of faceted surfaces.

7. The totally-enclosed fan-cooled motor according to claim 1, wherein the plate-shaped part and the plurality of faceted surfaces intersect at an angle between 100 to 115 degrees.

8. The totally-enclosed fan-cooled motor according to claim 1, wherein the air deflector is mounted to the endplate at a distance apart of 1 to 2 inches.

9. The totally-enclosed fan-cooled motor according to claim 8, wherein a space between the bearing holding the drive side of the rotation shaft and the air deflector communicates with an air layer.

10. The totally-enclosed fan-cooled motor according to claim 1, wherein the air deflector is mounted to the endplate via at least two through holes.

11. An air deflector for a totally-enclosed fan-cooled motor, comprising:
- an air deflector mounted to a rotation shaft so as to be located on an outer side of a bearing holding a drive side of the rotation shaft, outside a motor and in the vicinity of the bearing for cooling the bearing holding the drive side of the rotation shaft, wherein the air deflector includes:
- a plurality of faceted surfaces disposed at obtuse angles relative to each faceted surface about a periphery of the air deflector directed to deflect wind across the endplate and the drive side bearing, and
- a wind direction guide provided on the drive side for receiving wind sent from the external fan to change a direction of the wind toward the endplate and drive bearing.

12. The air deflector according to claim 11, wherein the plurality of faceted surfaces respectively extending in a direction away from the rotation shaft.

13. The air deflector according to claim 11, wherein the plurality of faceted surfaces are integrally connected.

14. The air deflector according to claim 11, wherein the plurality of faceted surfaces partially encompass the endplate.

15. The air deflector according to claim 11, wherein the plate-shaped part and the plurality of faceted surfaces intersect at an angle between 100 to 115 degrees.

16. The air deflector according to claim 11, wherein the air deflector is mounted to the endplate at a distance apart of 1 to 2 inches.

17. The air deflector according to claim 16, wherein a space between the bearing holding the drive side of the rotation shaft and the air deflector communicates with an air layer.

18. The air deflector according to claim 11, wherein the air deflector is mounted to the endplate via at least two through holes.

19. The air deflector according to claim 11, wherein the motor is a totally-enclosed fan-cooled motor.

20. The air deflector according to claim 11, wherein the air deflector is comprised of sheet metal.

* * * * *